Feb. 2, 1932.  G. T. MARKEY  1,843,138
FOWL CABINET
Filed Nov. 22, 1928  2 Sheets-Sheet 1

INVENTOR.
George T. Markey
BY Erwin, Wheeler & Woolard
ATTORNEYS.

Feb. 2, 1932.  G. T. MARKEY  1,843,138
FOWL CABINET
Filed Nov. 22, 1928  2 Sheets-Sheet 2

INVENTOR.
George T. Markey
BY
Erwin, Wheeler & Woolard
ATTORNEYS.

Patented Feb. 2, 1932

1,843,138

UNITED STATES PATENT OFFICE

GEORGE T. MARKEY, OF FORT ATKINSON, WISCONSIN, ASSIGNOR TO JAMES MANUFACTURING COMPANY, OF FORT ATKINSON, WISCONSIN, A CORPORATION OF WISCONSIN

FOWL CABINET

Application filed November 22, 1928. Serial No. 321,081.

My invention relates to improvements in fowl cabinets, with particular reference to cabinets commonly known as fattening batteries employed for confining poultry in such a manner that they can be fed and watered with minimum exercise during their final period of growth and preparation for the market.

In general, it is the object of this invention to provide means whereby fowls may be confined under sanitary, health promoting conditions from the time of hatching to the time when they are conditioned for market, and to facilitate feeding and watering the fowls while so confined under conditions which eliminate waste, protect the water and the feed from contamination, and otherwise promote maximum growth.

It is also my object to provide a brooding and fattening cabinet which may be adjusted or adapted to receive fowls varying in size from that of newly hatched chicks to those of marketable age and for periods varying from that required for growth to that required for fattening during final stages of growth.

More specifically stated, my objects are to provide means whereby the bottom of the cabinet may be removed and cleaned without removing or releasing the fowls and without danger of injuring them; to provide means whereby such cabinets may be equipped with removable bottoms and dropping pans, the marginal portions of which are protected from contamination in their positions of use; to provide means whereby the fowls may be conveniently moved backwardly from the front of the cabinet to facilitate adjusting the bottom portion, cleaning the feed trough or water trough, or re-arranging or repairing any of the associated mechanism; to provide feeding and watering facilities exterior to the housing portion of the cabinet and substantially co-extensive in length with the entire front wall of the cabinet; to provide means whereby a watering pan may be used in co-operation with a feed pan and in which the watering pan may be adjusted to control access to the feed; to provide means for readily removing said watering pan and also the feed pan for the purpose of cleansing and sterilizing the same; to provide automatic means for progressively moving food in a feed trough within reach of the fowls in the cabinet; to provide the wall of the cabinet with a continuous slot and associated bar, which is adjustable in height to accommodate fowls of different sizes, and which, in its normal position, will cover the rear wall of the feed pan in such a manner as to deflect dropping food over the upper margin of the said wall outwardly into the pan; and to accomplish all of said objects in a simple, inexpensive structure which can readily be kept free from parasites and in a condition of perfect sanitation and which will be so formed as to facilitate stacking or superposing the cabinets one upon another, or arranging them end to end or back to back, whereby a maximum number of fowls may be fattened within a building or room of given capacity.

In the drawings.

Like parts are identified by the same reference characters throughout the several views.

Figures 1, 3:
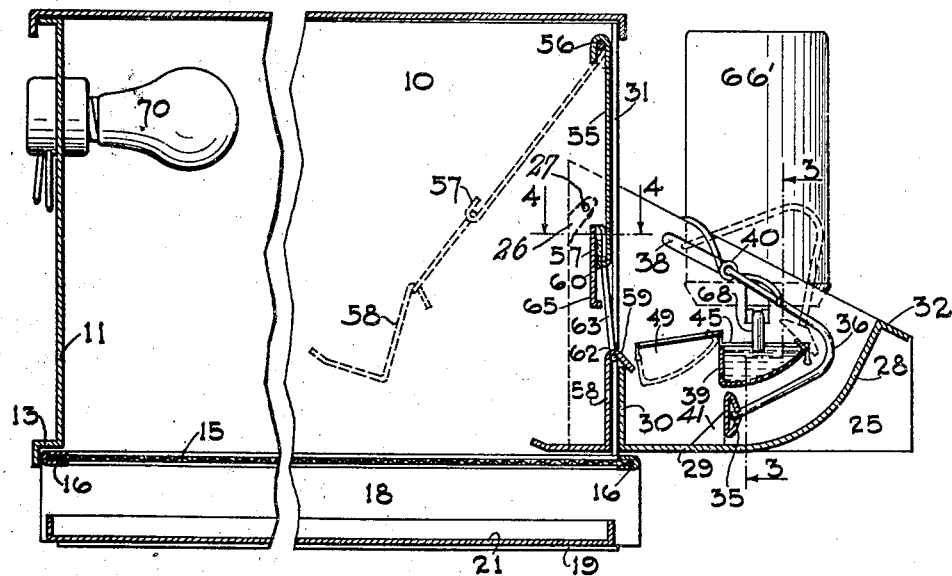
Figure 1 is a sectional view of a fattening battery embodying my invention, drawn to a vertical plane extending through the cabinet from front to rear.
Figure 3 is a fragmentary view of one end of the watering trough and associated feed trough taken on line 3—3 of Figure 1.
Figure 4:
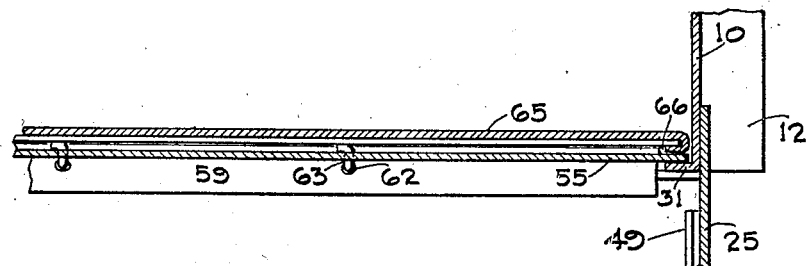
Figure 4 is a fragmentary sectional view taken on line 4—4 of Figure 2 to show the vertically adjustable slide for controlling the dimensions and height of the feeding slot.
Figure 2:
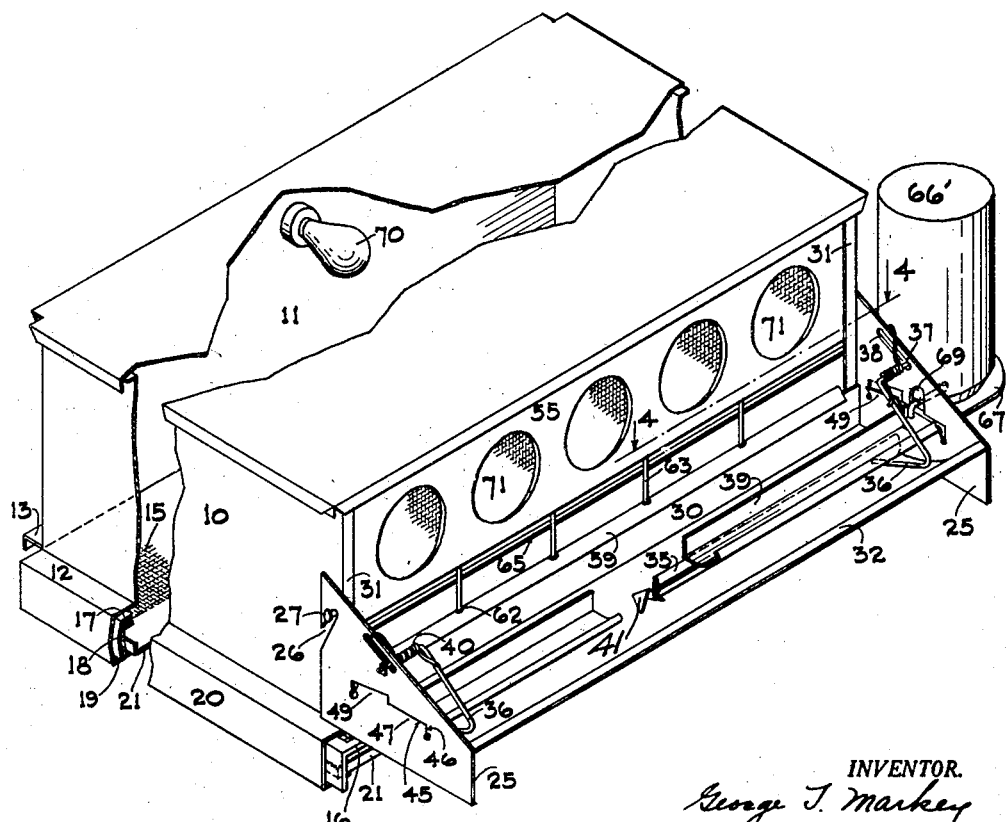
Figure 2 is an isometric view of the battery with portions of the walls broken away, the foraminous bottom partially withdrawn and portions of the water trough and pressure plate of the feed trough also broken away.

The cabinet is preferably formed of sheet metal with end walls 10 and rear wall 11 outwardly offset in the bottom portion, as indicated respectively at 12 and 13 in Figure 2, the outward offset 13 being also illustrated in Figure 1. A foraminous floor 15 is preferably composed of woven or interlaced wire with front and rear margins provided with sheet metal binding strips 16 and side margins which have similar binding strips 17, which are of greater width, whereby portions of these bindings beyond the wire or which enclose wire may be down turned to form slide bars 18 adapted to run upon suitable tracks formed by the inturned lower margins 19 of the end wall portions 20.

It is not material to the invention herein claimed whether the inturned margins 19 serve merely as tracks for the slides 18 and supports for a pan 21, or whether they are continuous underneath the cabinet and serve as a bottom wall therefor. The cost of manufacture may be reduced by forming the portions 19 simply as marginal flanges of the end walls of sufficient width to support the slides 18 and the pan 21. The dimensions of the latter are preferably slightly greater than the internal dimensions of the cabinet in a horizontal plane, whereby the margins of the pan may be protected by the overhanging walls 12 and 13, and this is also true of the binding margins 16 and 17 of the foraminous floor. It will therefore be obvious that the operation of cleansing the pan and floor will be simplified and expedited, both the pan and the floor being capable of withdrawal for that purpose at the front side of the cabinet.

A feed trough is supported along the front side of the cabinet by end trough walls 25 which have their rear margins suitably notched, as indicated at 26, to allow these walls to be hung upon headed pins 27 projecting outwardly from the cabinet walls 10. The lower margins of the end trough walls 25 rest upon the shoulders formed by the offset portions 12 of the end walls 10, and these shoulders 12 cooperate with the pins 27 in holding the trough in position. The end walls of the trough are connected with each other by a piece of sheet metal, suitably bent to form a downwardly and inwardly curving front wall 28, bottom wall 29, and rear wall 30. At its end, this wall 30 abuts inturned flanges 31 carried by the end walls 10, which flanges also co-operate in supporting the feed trough.

The upper margin 32 of the front wall 28 of the feed trough is preferably outwardly and downwardly inclined. A presser plate 35 is supported under resilient inward pressure within the feed trough, whereby the feed may be progressively pushed rearwardly as the contents of the trough are reduced by the feeding fowls. This presser plate may be conveniently supported from the end walls 25 of the trough by arms 36, preferably of wire with end portions 37 outwardly turned and engaged in suitable slots 38 formed in the end walls 25 near their upper margins. The intermediate portions of these wire presser plate arms are bent or elbowed, so as to extend around and underneath a watering trough 39, and spring wire strands are coiled about the portions 37 of the wire arms with ends engaging the intermediate portions of the arms and the upper margins of the end walls 25 in such a manner that these springs 40 constantly urge the presser plate toward the rear wall 30 of the feed trough. Stops 41 limit the movement of the presser plate in this direction.

The watering trough 39 is suspended in a raised position within the feed trough above the field of movement of the presser plate 35, the ends of the watering trough being connected with the end walls 25 of the feed trough. To facilitate adjustably connecting the watering trough with said walls 25, the latter are preferably provided with horizontal slits 45 and downwardly extending vertical slits 46, whereby the material may be bent inwardly, as clearly shown in Figure 3, to form supporting lips 47, on the upper margins of which, hook shaped flanges 48 on the end walls of the water trough may be engaged.

By additionally slitting the end walls 25, obliquely pitched lips 49 may be provided at the rear and slightly above the lips 47, whereby the watering trough may be suspended in a tilted position from the lips 49 directly over the inner or rear portion of the feed trough, as plainly indicated by dotted lines in Figure 1. When the water trough is in this position it prevents the fowls from obtaining access to the food.

Except for the end flanges 31 of the end walls and a depending flange preferably carried by the top wall, the front of the cabinet may be left without any fixed wall portion. But a swinging upper front wall member 55 has its upper margin hooked over a rod 56 and its lower margin is also folded to provide a hook or set of hooks 57.

A lower front wall member 58 has its upper marginal portion 59 outwardly and downwardly inclined so that it may be hooked over the rear wall 30 of the feed pan and by providing apertures 60 along the folding line at the bottom of the wall member 55 and similar apertures 62 along the folding line at the top of the wall member 58, these two wall members may be linked together by lacing strands of wire 63 through said apertures. Said strands of wire 63 not only serve as supporting links connecting the wall member 58 with the wall member 55, but they may also serve as spacing bars to prevent the fowls from interfering with each other when feeding. The spaces between the vertical portions of these wires 63 allow the fowls to extend their heads through these spaces for access to the water trough and also to the feed trough when the water trough is in its normal position of suspension from the lips 47.

A feed regulating slide 65 may be utilized to control the vertical dimensions of the openings through which the fowls obtain access to the water and feed troughs. This slide comprises a strip of sheet metal having its ends engaged in suitable guideways 66 formed on the inner faces of the end walls 10 of the cabinet. The slide may be initially raised to provide a narrow slot between its lower margin and the upper folded margin of the wall member 58, thus allowing small fowls to obtain access to the feed and water without allowing them to pass through the openings.

As the fowls increase in size the slide 65 may be progressively raised to increase the size of the feeding slot until it becomes desirable to limit the vertical dimensions of said slot, while still increasing the height at which the slot is located. When this condition exists, the slide may be lowered below the lower margin of the wall member 55, thus providing a feeding slot above the slide. The vertical position of the slide will in any case allow the vertical dimensions of the feeding slot and also the height of the slot to conform to the requirement for fowls of the size within the cabinet.

Any suitable means may be employed for holding the slide in position. Ordinarily, it may be locked by raising one end above the other to cause the ends to bind in the slideways.

The above described cabinet is preferably wholly composed of sheet metal and wire. When a water supply is otherwise not available a storage tank 66' may be supported on a shelf 67 and provided with a feed pipe 68 projecting through a hole 69 in one end wall of the feed trough, so that water may be delivered directly into the water trough 39.

The water trough being removable from the feed trough and the latter being removable from the cabinet body by simply lifting them out of place in a substantially vertical direction, the contents need not be spilled, and they may therefore be cleansed and disinfected frequently without spilling or scattering infected contents. The pan 21 may be drawn out as often as desired without disturbing the fowls, but when the screen 15 is to be removed, the movable front wall members will first be pushed inwardly to press the fowls toward the back wall of the cabinet. Then, the screen may be drawn out without danger of injury to their feet or legs, since the wall member 58 will be free to swing. When replacing the screen, the fowls will again be pressed backwardly and the screen pushed in far enough to allow the fowls to jump upon it from the pan as it is then pushed slowly into place. By protecting the margins of the pan and screen underneath the overhanging shelves 12 and 13, it will ordinarily be necessary to clean only one surface of each.

The cabinet above described is peculiarly adapted for stacking purposes, an electrical lamp 70 being preferably provided for the purpose of illumination when the containers are stored or stacked in a dark room. By pushing the swinging wall inwardly the fowls may be inspected while the interior of the cabinet is being adequately lighted. The cabinet may also be inspected or viewed through suitable screened window openings 71 in the wall member 55. The wall members 55 and 58 are normally held in position by the engagement of the hook flange 59 with the rear wall 30 of the feed pan.

This flange 59 not only co-operates with the studs 27 in the notches 26 of the end walls to hold the feed trough in position, but it prevents food from being scattered into the space between the walls 30 and 58. Also it deflects any food thrown by the fowls upwardly along the wall 30 back into the feed trough. Inasmuch as the fowls must insert their heads through the slot-like space between the wall 39 of the water trough and the wall 30 of the feed trough, scattering of food into the water trough is effectually prevented, and any food thrown in the other direction is deflected back into the trough by the deflector 59. The narrow feeding space thus provided is an important feature of my invention, in that it prevents food from being thrown into the water trough, and also prevents waste.

I claim:

1. A feeding and watering cabinet for fowls, comprising the combination with a removable cabinet floor, of a wall provided with a suspended member along its lower margin, said wall being movable inwardly over the cabinet floor in a direction opposite that in which the floor is moved when being withdrawn.

2. A feeding and watering cabinet for fowls comprising the combination with a removable cabinet floor, of a wall provided with a suspended member along its lower margin, said wall being movable inwardly over the cabinet floor in a direction opposite that in which the floor is moved when being withdrawn, and a feed trough separated from the inhabited portion of the cabinet by said movable wall, the suspended member of which is spaced from the upper portion of the movable wall to allow access to the feed trough.

3. A feeding and watering cabinet for fowls comprising the combination with fixed cabinet walls, of a suspended wall member adapted to be swung inwardly from one side of the cabinet, a second member suspended from the lower margin of the first suspended wall member and spaced therefrom, and a slide bar adjustable substantially in the plane of said members across said space to provide a feed opening for the fowls, the height and vertical dimensions of which may be determined by the position of the slides.

4. A feeding and watering cabinet for fowls comprising the combination with fixed cabinet walls, of a suspended wall member adapted to be swung inwardly from one side of the cabinet, a second member suspended from the lower margin of the first suspended wall member and spaced therefrom, and a slide bar adjustable substantially in the plane of said members across said space to provide a feed opening for the fowls, the height and vertical dimensions of which may be determined by the position of the slide, said cabinet having a feed trough extending along the outer side of the movable wall below said feed opening.

5. A feeding and watering cabinet for fowls comprising the combination with fixed cabinet walls, of a suspended wall member adapted to be swung inwardly from one side of the cabinet, a second member suspended from the lower margin of the first suspended wall member and spaced therefrom, and a slide bar adjustable substantially in the plane of said members across said space to provide a feed opening for the fowls, the height and vertical dimensions of which may be determined by the position of the slide, said cabinet having a feed trough extending along the outer side of the movable wall below said feed opening, and a watering trough substantially co-extensive in length with that of the feed trough and removably supported from the ends thereof.

6. A feeding and watering cabinet for fowls comprising the combination with the body of the cabinet, of a detachable feed trough supported from the cabinet along one wall thereof, and a watering trough removably supported from the walls of the feed trough above the bottom thereof, in a position to allow one wall of the water trough to co-operate with one wall of the feed trough to provide a slot-like passage permitting access by the fowls to the feed while protecting the water in the watering trough from contamination by scattered feed and other material, said cabinet having an elongated slot in the associated wall, normally allowing access to both the feed and watering troughs.

7. A feeding and watering cabinet for fowls comprising the combination with the fixed body walls of the cabinet, of a swinging wall provided with an elongated opening, a feed trough detachably connected with the body of the cabinet and extending along said opening on the exterior side of the movable wall and means for adjustably determining the height and vertical dimensions of the feed opening.

8. A feeding and watering cabinet for fowls comprising the combination with the fixed body walls of the cabinet, of a swinging wall provided with an elongated opening, a feed trough detachably connected with the body of the cabinet and extending along said opening on the exterior side of the movable wall, and means for adjustably determining the height and vertical dimensions of the feed opening, said means including a set of spaced wall members linked together and a slide adjustable at various heights across the space between said members.

9. A feeding and watering cabinet for fowls comprising the combination with a set of fixed walls, of a swinging wall suspended from the fixed walls at its upper margin and composed of a pair of wall members extending horizontally at different levels in spaced relation to each other and linked together, and a slide bar adjustable across this space between said members to provide a slot-like feed opening, the height and vertical dimensions of which may be determined by the position of the slide, and an exterior feed trough to which access may be had through said opening.

10. A feeding and watering cabinet for fowls comprising the combination with a set of fixed walls, of a swinging wall suspended from the fixed walls at its upper margin and composed of a pair of wall members extending horizontally at different levels in spaced relation to each other and linked together, a slide bar adjustable across the space between said members to provide a slot-like feed opening, the height and vertical dimensions of which may be determined by the position of the slide, and an exterior feed trough to which access may be had through said opening, said exterior feed trough being removably connected with the body of the cabinet and the lower member of the swinging wall being provided along its upper margin with a hook-shaped flange adapted to engage over the inner margin of the trough when in normal position.

11. A feeding and watering cabinet for fowls in combination with a feed trough having a watering trough removably suspended therein above the bottom of the feed trough, and adjustably supported in an upright position to allow or prevent access to the feed.

12. A feeding and watering cabinet for fowls in combination with a feed trough having a watering trough removably suspended therein above the bottom of the feed trough, and means for adjustably supporting the watering trough either to a position allowing access by fowls in the cabinet to both water and feed or to a position obstructing access by such fowls to the feed.

13. In a cabinet for fowls the combination of a set of opposing walls provided with floor supporting slide-ways, a removable floor having down turned margins adapted to travel on said slide-ways, and a droppings pan supported by and adapted to travel on said slide-ways between the down turned floor margins.

14. In a cabinet for fowls the combination with a foraminous floor having margins provided with folded sheet metal binding strips, two of which are substantially parallel and down turned to form supporting slides, of a pan adapted to be moved into and out of the space between said slides, the base portion of said cabinet being laterally enlarged and adapted to receive the side margins of the pan, and the slides, in the laterally enlarged portions of the cabinet.

15. In a cabinet for fowls provided with a slot-like opening extending horizontally in one of its walls, a feed trough having end walls adapted for interlocking releasable engagement with body walls of the cabinet to normally hold the trough in position against the slotted body wall, and means for varying the size and height of said slot-like opening.

16. In a feeding trough for fowls provided with oblique end flanges, a watering trough having ends provided with hook shaped margins supported from the end wall flanges of the feeding trough in a position to partially cover the food receiving portion thereof, and movable on said flanges transversely of the feed trough.

17. In a feeding trough for fowls, a watering trough supported from the end walls of the feeding trough in a position to partially cover the food receiving portion thereof, in combination with a presser plate movable in an arc about one side of the water trough to progressively deliver material toward the portion of the feed trough at the opposite side thereof.

18. In a feeding trough for fowls, a watering trough supported from the end walls of the feeding trough in a position to partially cover the food receiving portion thereof, in combination with a presser plate movable in an arc about one side of the water trough to progressively deliver material toward the portion of the feed trough at the opposite side thereof, said presser plate being provided with resiliently urged supporting arms connected with the ends of the feed trough and adapted to automatically move the presser plate against the feed.

19. A cabinet for fowls partially open along one side, an exterior feed trough having one wall partially obstructing said opening, and a wall member normally substantially parallel to said wall of the feed trough, and having a hook shaped upper marginal portion engaged over the upper margin of said feed trough wall and extending obliquely downwardly into the feed trough in a position to serve as a deflector for food thrown or drawn by the fowls upwardly along the wall which said marginal portion overhangs.

GEORGE T. MARKEY.